(12) United States Patent
Kuo

(10) Patent No.: US 10,692,078 B1
(45) Date of Patent: Jun. 23, 2020

(54) CONSUMER DEVICE GENERATION OF LIMITED-USE CREDIT CARD NUMBERS

(71) Applicant: NortonLifeLock Inc., Tempe, AZ (US)

(72) Inventor: Chengi Kuo, Manhattan Beach, CA (US)

(73) Assignee: NortonLifeLock Inc., Tempe, AZ (US)

( * ) Notice: Subject to any disclaimer, the term of this patent is extended or adjusted under 35 U.S.C. 154(b) by 144 days.

(21) Appl. No.: 15/849,317

(22) Filed: Dec. 20, 2017

(51) Int. Cl.
*G06Q 20/38* (2012.01)
*G06Q 20/34* (2012.01)
*G06Q 20/32* (2012.01)

(52) U.S. Cl.
CPC ....... *G06Q 20/385* (2013.01); *G06Q 20/3278* (2013.01); *G06Q 20/354* (2013.01); *G06Q 20/357* (2013.01)

(58) Field of Classification Search
CPC .................................................. G06Q 20/385
USPC ............................................................ 705/44
See application file for complete search history.

(56) References Cited

U.S. PATENT DOCUMENTS

| | | | | |
|---|---|---|---|---|
| 8,352,370 B1 * | 1/2013 | White | ................... | G06Q 40/02 705/38 |
| 8,601,552 B1 * | 12/2013 | Bowers | ................... | G06F 21/36 713/182 |
| 9,652,770 B1 * | 5/2017 | Kurani | ................... | G06Q 20/36 |
| 2002/0184539 A1 * | 12/2002 | Fukuda | ................ | H04L 63/0807 726/21 |
| 2008/0116285 A1 * | 5/2008 | Shoemaker | ...... | G06K 19/06187 235/493 |
| 2010/0250929 A1 * | 9/2010 | Schultz | ................. | H04L 63/083 713/168 |
| 2014/0089196 A1 * | 3/2014 | Paya | ....................... | G06F 21/31 705/44 |
| 2015/0249918 A1 * | 9/2015 | Li | ......................... | H04W 12/04 380/270 |
| 2015/0381363 A1 * | 12/2015 | Teixeira | ................ | H04L 9/3228 380/45 |
| 2016/0358397 A1 * | 12/2016 | Kristensen | ......... | G07C 9/00309 |
| 2017/0116594 A1 * | 4/2017 | Rietzler | ................. | G06Q 20/20 |
| 2017/0293902 A1 * | 10/2017 | Florimond | ........... | G06Q 20/102 |

FOREIGN PATENT DOCUMENTS

WO WO-2017100832 A1 * 6/2017 ....... G06Q 20/40145

* cited by examiner

*Primary Examiner* — William E Rankins
(74) *Attorney, Agent, or Firm* — FisherBroyles, LLP

(57) ABSTRACT

Methods and systems for generating limited-use credit card numbers at a consumer device and verifying said numbers for completing transactions are provided. One example method generally includes determining a current time; generating a first series of digits based on the current time and an account credential associated with an account number; combining, by the consumer device, the first series of digits with the account number to form a first card number; and making the first card number available for use.

20 Claims, 7 Drawing Sheets

CONSUMER DEVICE GENERATION OF LIMITED-USE CREDIT CARD NUMBERS

BACKGROUND

Field

Embodiments of the present invention generally relate to limited-use credit card numbers and more particularly to systems and methods of facilitating limited-use credit card numbers in purchasing transactions.

Description of the Related Art

Credit cards are commonly used in place of cash for purchasing various goods and/or services. However, there may be a high risk of fraudulent activity when using a standard credit card. For example, in many cases, completing a purchase involves submitting only a credit card number. Thus, if someone besides the owner of the card acquires the credit card number, such a person may be able to use the credit card number for purchases. Further, security breaches at retailers or online financial institutions have in the past resulted in many card numbers becoming available to malicious persons, and thus subject to fraudulent transactions. When a card number is made insecure by a security breach, the card number is typically cancelled, and a new card number is issued, to the expense and inconvenience of financial institutions and customers alike, to say nothing of costs as a result of fraudulent purchases.

As a result of such breaches and to increase security generally, some financial institutions have introduced options for consumers to use credit card numbers limited in some way, such as to a single transaction or a given period of time. Such a limited-use credit card number may be used for purchases at a vendor that may be untrustworthy, or may be at risk of a security breach exposing credit card numbers. However, financial institutions offering such credit card numbers typically themselves generate a new limited-use credit card number associated with the user's account, store the new number in a database record associated with a more permanent credit card number on a server of the financial institution, and send the new number to the user. This process may be performed each time a user requests a new limited-use credit card number, and delays in the process may prevent the user from completing a purchase, or lead to the user completing the purchase with a less secure, more permanent credit card number.

Thus, systems and methods to facilitate the generation of limited-use credit card numbers without relying on financial institution systems at the time of purchase are desired.

SUMMARY

One embodiment is a method for generating limited-use credit card numbers by a consumer device. The method generally includes determining a current time; generating a first series of digits based on the current time and an account credential associated with an account number; combining, by the consumer device, the first series of digits with the account number to form a first card number; and making the first card number available for use.

Another embodiment is a consumer device. The consumer device includes a processor and a memory coupled to the processor. The memory has instructions stored thereon which, when executed by the processor, perform an operation for generating limited-use credit card numbers. The operation generally includes determining a current time; generating a first series of digits based on the current time and an account credential associated with an account number; combining the first series of digits with the account number to form a first card number; and making the first card number available for use.

Still another embodiment is a non-transitory computer-readable medium having instructions stored thereon which, when executed by a processor of a consumer device, perform an operation for generating limited-use credit card numbers by the consumer device. The operation generally includes determining a current time; generating a first series of digits based on the current time and an account credential associated with an account number; combining, by the consumer device, the first series of digits with the account number to form a first card number; and making the first card number available for use.

Still another embodiment is a method for validating a limited-use credit card number. The method generally includes receiving over a network a request for a first transaction comprising a card number and a timestamp for the first transaction, wherein the card number comprises an account portion and a generated portion; determining an account number from the account portion; obtaining a creation time from the generated portion; determining whether the creation time is within a threshold time of the timestamp; and processing the first transaction according to the account number if the creation time is within the threshold time of the timestamp.

Still another embodiment is a system including a processor and a memory coupled to the processor. The memory has instructions stored thereon which, when executed by the processor, perform an operation for validating a limited-use credit card number. The operation generally includes receiving over a network a request for a first transaction comprising a card number and a timestamp for the first transaction, wherein the card number comprises an account portion and a generated portion; determining an account number from the account portion; obtaining a creation time from the generated portion; determining whether the creation time is within a threshold time of the timestamp; and processing the first transaction according to the account number if the creation time is within the threshold time of the timestamp.

Still another embodiment is a non-transitory computer-readable medium having instructions stored thereon which, when executed by a processor, perform an operation for validating a limited-use credit card number. The operation generally includes receiving over a network a request for a first transaction comprising a card number and a timestamp for the first transaction, wherein the card number comprises an account portion and a generated portion; determining an account number from the account portion; obtaining a creation time from the generated portion; determining whether the creation time is within a threshold time of the timestamp; and processing the first transaction according to the account number if the creation time is within the threshold time of the timestamp.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
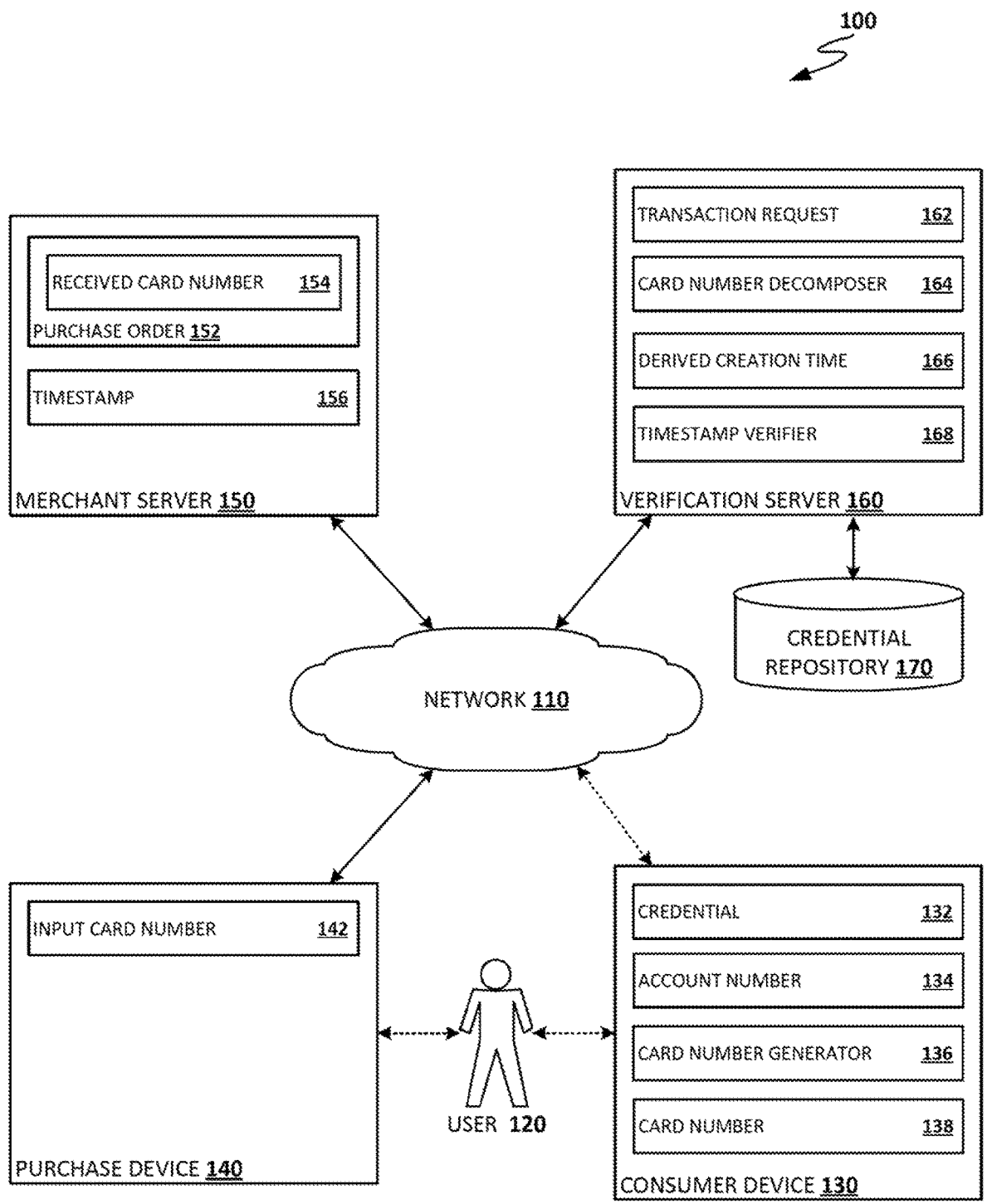
FIG. 1 illustrates an example computing environment in which systems of the present disclosure may operate, according to one embodiment.

One drawback to currently available limited-use credit card numbers is that such numbers are generated before the time of purchase by a financial institution computer system and delivered to a purchaser to use the number. That process can create complications for purchasers, if the financial institution computer system is unavailable, if the financial institution computer system is overloaded with requests from other users causing delays, or if any technical problems within the network are causing delays.

Even when the process functions as intended, problems may exist. The financial institution may face a number of inefficiencies as a result. For example, because a number is generated for a single purchase, each number is typically stored on the financial institution computer system, which can lead to a large amount of stored numbers for each customer of the financial institution. The financial institution may also be inclined to dedicate significant computing resources to the generation and transmission of generated numbers. For a customer, a purchase using a limited-use credit card may be inconvenient even when the process functions normally. For example, the customer may typically request a number before the purchase, which may add complications to the purchase if such a request entails additional information from the customer. Further, even the properly running process may likely have some delay between request and response. These inconveniences may lead to the customer using a permanent credit card number instead, or using a different payment method entirely, such as cash.

In order to solve these problems, a limited-use credit card number may instead be generated on a consumer device, rather than by a financial institution computer system, in accordance with embodiments of the invention. As discussed in further detail herein, if the consumer device and a verification server initially share an account credential associated with a user's account, the consumer device and the verification server may use the account credential as a key to secure communications.

The consumer device may generate the limited-use credit card number by accessing the account credential and the current time. For example, the account credential and the current time may be supplied at the consumer device to a pseudo-random number generator as seeds. Then, the verification server may be able to apply a similar pseudo-random number generator using the account credential and a timestamp as input. The timestamp may indicate when a transaction using the limited-use credit card number occurred. The pseudo-random number generator will then produce a verification number based on those inputs (seeds). If the verification number matches the number initially produced by the pseudo-random number generator of the consumer device, the transaction may be verified. If not, the verification server may step back the timestamp and regenerate until the numbers do match (or a timeout occurs). The verification server may thus be able to determine when the number was initially generated. If the timestamp has to be stepped back too far before finding a match, the verification server may determine the number is no longer valid as it was generated too long before the transaction. This may allow the consumer device to unilaterally generate a limited-use credit card number, and avoid the problems of remote number generation at the time of purchase.

FIG. 1 illustrates an example computing environment 100 in which systems of the present disclosure may operate, according to an embodiment. Computing environment 100 may include purchase device 140, merchant server 150 and verification server 160, all connected via network 110. Computing environment 100 may also include consumer device 130 operated by user 120. User 120 may also operate purchase device 140. The consumer device 130 may also be connected to the network 110.

Consumer device 130 may be used to generate a limited-use credit card number for user 120. As illustrated, consumer device 130 may include credential 132, account number 134, card number generator 136, and card number 138. Credential 132 may be received by consumer device 130 from verification server 160, either indirectly by input from user 120, or directly over a network, such as network 110. A credential may be created by verification server 160 for each user 120 that uses a limited-use card number. Verification server 160 may store all created credentials in credential repository 170. Credential 132 may be a series of digits associated with a user account of user 120 and distinct from account number 134. Credential 132 may be a number that user 120 is unaware of. Credential 132 may be securely communicated between consumer device 130 and verification server 160 without knowledge or direct involvement from user 120. If credential 132 is kept secret from user 120, security may be increased. For example, a common security problem is that users will often mistakenly give their account information out. If a user is unaware of credential 132, the user will be unable to compromise the number.

Account number 134 may be a series of digits associated with user 120 which make up a portion of a credit card number. For example, for a credit card number having sixteen digits, the first thirteen of those digits may represent the account number of the credit card. The account number 134 may be assigned by the financial institution that issued the credit card number to the user 120.

Card number generator 136 may generate a limited-use credit card number, such as card number 138, as discussed in more detail with respect to FIG. 4 below. Generally, card number generator 136 may use a current time and credential 132 to generate a series of digits. This series may be combined with (e.g., appended to) digits of account number 134 to create card number 138. For example, to create a credit card number having sixteen digits and a three-digit security code (e.g., a card verification value (CVV)), card number generator 136 may generate six digits to be the last three digits of the card number and the entirety of the security code, while the first thirteen digits are taken from a static account number. For other examples, the generated digits may precede account number 134 or be interposed therewith to generate the card number. Credit card numbers with different numbers of total digits may also be possible to generate, along with credit card numbers without security codes and credit card numbers with different amounts of digits representing account numbers. After card number 138 is generated, consumer device 130 may make card number 138 available to user 120. For example, consumer device 130 may display card number 138 on a screen of consumer device 130, or transmit card number 138 to a different device (e.g., purchase device 140).

By generating the limited-use credit card number on consumer device 130 various logistical and technical issues may be avoided. For example, generating numbers on a consumer device physically located with a user may prevent network delays associated with transmission of data from a financial institution server to the consumer device. Further, generating separately from the financial institution server may lessen load and strain on the financial institution server, which could devote computing resources to other tasks. Even further, the process of requesting the limited-use credit card number according to embodiments of the disclosure may be simpler and involve the user providing less information to the financial institution at the time of purchase.

Purchase device 140 may be used, in some embodiments, to make a purchase using a limited-use credit card number generated by consumer device 130. In this embodiment, two devices are used to accomplish generation of the number and making a purchase. In other embodiments, the functions of purchase device 140 and consumer device 130 may be consolidated into a single device (e.g., a laptop computer or smartphone). Purchase device 140 may include input card number 142, which may be input on purchase device 140 by user 120 or transmitted via wire or wirelessly from consumer device 130 to purchase device 140. Input card number 142 corresponds to card number 138 generated by card number generator 136. Purchase device 140 may transmit a purchase order, such as purchase order 152, to merchant server 150 over network 110.

Merchant server 150 may receive a purchase order from purchase device 140 and request to be paid for the purchase by submitting a transaction request, such as transaction request 162, to verification server 160, for example, over network 110. As illustrated, merchant server 150 may include purchase order 152 and timestamp 156. Received card number 154 is received from purchase device 140 as part of purchase order 152 and corresponds to input card number 142 and card number 138. Merchant server 150 submits received card number 154 as a transaction request to verification server 160 along with timestamp 156 indicating the time the transaction request was submitted.

Verification server 160 may verify a limited-use credit card number generated by consumer device 130, as described in detail below with respect to FIG. 5. A limited-use credit card number, such as card number 138, may be received by verification server 160 from merchant server 150 as received card number 154 as part of a request to pay funds on a purchase order. As illustrated, verification server 160 may include transaction request 162, card number decomposer 164, derived creation time 166, and timestamp verifier 168. Verification server 160 may be connected to credential repository 170.

Transaction request 162 is received from merchant server 150 and may contain details of a transaction. Details of a transaction may include a credit card number used for a purchase, such as received card number 154, and/or a time that the transaction request was submitted by merchant server 150 (or received by verification server 160), such as timestamp 156. Transaction request 162 may generally be a request for verification server 160 to process a transaction and pay funds to satisfy purchase order 152.

Card number decomposer 164 may decompose a card number using the information contained in transaction request 162 and an account number, such as account number 134, associated with received card number 154. For example, a limited-use credit card number may comprise a section corresponding to an account number and a section corresponding to pseudo-randomly generated digits. Card number decomposer 164 may obtain an account number from the section of the card number corresponding to the account number. Card number decomposer 164 may also identify an account credential associated with the account number. For example, credential repository 170 may be accessed to locate an account credential corresponding to account number 134. In one embodiment, account number 134 may correspond to an account number associated with a limited-use credit card number, and credential 132 may correspond to an account credential stored in credential repository 170. Card number decomposer 164 uses the account number, such as account number 134, and the account credential, such as credential 132, to determine a time at which the limited-use credit card number was generated, represented as derived creation time 166.

Timestamp verifier 168 compares derived creation time 166 with timestamp 156 included in transaction request 162. If derived creation time 166 and timestamp 156 are within a certain threshold time of each other, verification server 160 may validate the transaction request 162, process the transaction, and send a confirmation message to merchant server 150. The threshold time may be any suitable length of time to allow merchant server 150 to process and transmit a transaction, but should not be so long as to maintain validity for the limited-use credit card number beyond its intended limits.

Figure 2:
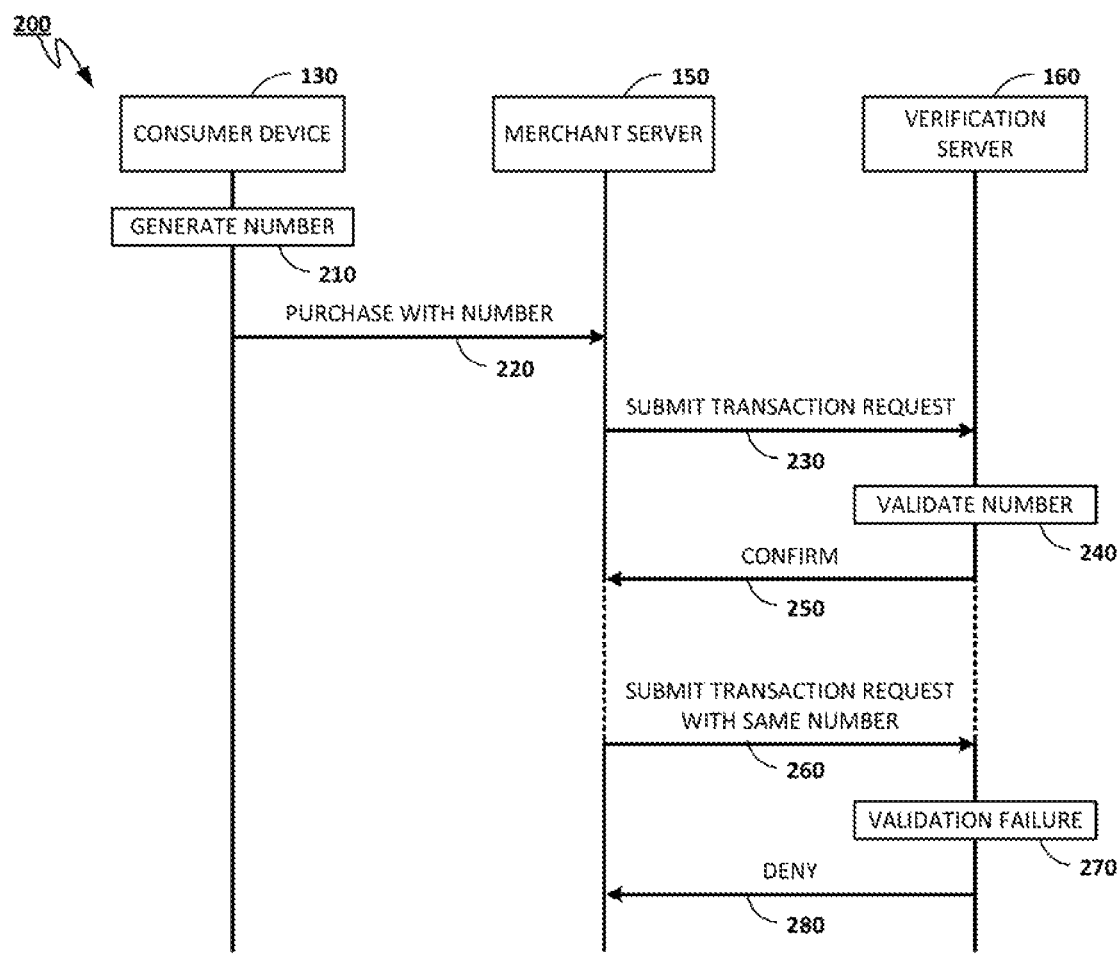
FIG. 2 is a call-flow diagram representing example operations for consumer generation and validation of limited-use credit card numbers according to one embodiment.

FIG. 2 is a call-flow diagram of an example process 200 for generating and validating a limited-use credit card number. As illustrated, the process 200 involves interactions between a consumer device 130, a merchant server 150, and a verification server 160.

The process 200 may begin at block 210 where consumer device 130 may generate a limited-use credit card number. This generation is described in greater detail below with respect to FIG. 4. Generally, consumer device 130 may use an account number and the current time to generate a series of digits to be appended to or otherwise combined with an account portion of a credit card number.

At transmission 220, consumer device 130 may submit the number generated at block 210 to the merchant server 150 to make a purchase. Making a purchase may not require the purchaser and a credit card to be physically present before a merchant. Such purchases may be referred to as card not present (CNP) purchases. CNP purchases may be made over a network, such as the Internet, verbally during a phone call, or other various methods. One example of making such a purchase may involve transmitting a purchase order to merchant server 150. In this embodiment as illustrated, consumer device 130 both generates the limited-use credit card number and makes the purchase. However, in other embodiments, one device may generate the limited-use credit card number, and another separate device may make the purchase.

At transmission 230, merchant server 150 may submit a transaction request to verification server 160. A transaction request may include a limited-use credit card number generated by consumer device 130 and a timestamp indicating the time a transaction request was submitted by merchant server 150 to verification server 160. Merchant server 150 may not be able to determine that the limited-use credit card number is such, and may treat the number the same as any credit card number. If so, merchant server 150 may store the limited-use credit card number in a database of credit card numbers. However, even if this database is later breached, the limited-use credit card number will no longer be valid, and will thus not subject a user's credit card number to fraudulent or malicious use.

At block 240, verification server 160 may validate the limited-use credit card number received in the transaction request sent by merchant server 150. Validating limited-use credit card numbers is described in greater detail below with respect to FIG. 5. Generally, verification server 160 determines a creation time of the limited-use credit card number, using an account credential associated with the limited-use credit card number. If the creation time is within a certain threshold of the timestamp received from merchant server 150, the limited-use credit card number may be validated.

At transmission 250, verification server 160 may send a confirmation to merchant server 150. The confirmation may indicate that the limited-use credit card number was validated, and that the transaction will process as requested.

In some cases, merchant server 150 may subsequently submit at transmission 260 a second transaction request including the same credit card number as the transaction request of transmission 230. This second transaction request may include a different timestamp from the initial transaction request, but may still include both a limited-use credit card number and a timestamp.

At block 270, verification server 160 attempts to validate the limited-use credit card number of the second transaction request, but the validation attempt ends in failure. A failure may occur if the creation time of the limited-use credit card number is outside the threshold with respect to the timestamp of the transaction request (e.g., submitted with transmission 230). This may indicate that the transaction request, and the underlying purchase, occurred outside an acceptable window of time when compared to a time when the limited-use credit card number was generated. For example, if the creation time is one minute before the timestamp, such a transaction may be accepted. If the creation time is several days before the timestamp, such a transaction may be rejected.

At transmission 280, as a result of the validation failure at block 270, verification server 160 transmits a transaction request denial to merchant server 150. In some embodiments, this denial may include an alert to merchant server 150 that the purchase order may have been requested fraudulently. In some embodiments, concurrently with or at a different time from the denial transmission, verification server 160 may alert a user associated with the limited-use credit card number of this failed attempt to use the limited-use credit card number.

Figure 3:
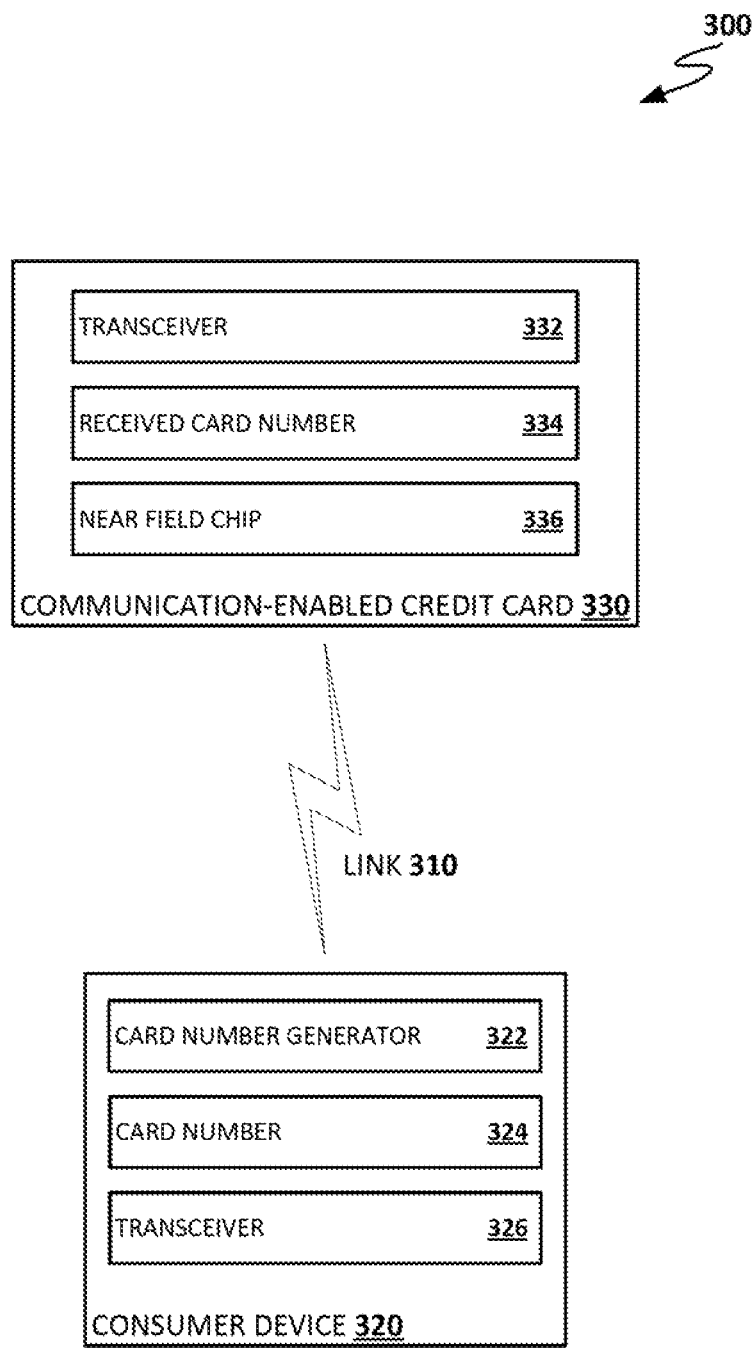
FIG. 3 illustrates an example computing environment for interaction between a consumer device and a communication-enabled credit card according to one embodiment.

FIG. 3 illustrates an exemplary computing environment 300 for interaction between a consumer device 320 and a communication-enabled credit card 330. As illustrated, consumer device 320 and communication-enabled credit card 330 may communicate over link 310.

Consumer device 320 may be used to generate limited-use credit card numbers. Consumer device 320 may be essentially the same as consumer device 130 of FIG. 1. As illustrated, consumer device 320 may include card number generator 322, card number 324, and transceiver 326. Card number generator 322 (which may be analogous to card number generator 136) creates a limited-use credit card number, shown as card number 324 (analogous to card number 138), by combining a series of generated digits with an account number (e.g., by adding to the end of the account number).

In some embodiments, consumer device 320 may use transceiver 326 to transmit card number 324. This may be done without direct involvement by a user of consumer device 320, such as the user entering card number 324 into a different device. Transceiver 326 may be configured to communicate using link 310. Link 310 may be a wireless link implemented with any short-range protocol, such as Bluetooth.

Communication-enabled credit card 330 is a device which may perform the functions of a credit card for physical credit card purchases, but which may also communicate using link 310. One example of communication-enabled credit card 330 is a Bluetooth-capable credit card. As illustrated, communication-enabled credit card 330 may include transceiver 332, received card number 334, and near field chip 336. Transceiver 332 is enabled to communicate with transceiver 326 of consumer device 320, across link 310. Received card number 334 may be received by communication-enabled credit card 330 via transceiver 332. Once received, received card number 334 may be communicated to a point of sale (POS) device via near field chip 336.

In some embodiments, communication-enabled credit card 330 may be powered by a short-term power source which allows communication-enabled credit card 330 to communicate over link 310. One example of this may include inductive coupling or other wireless power transfer from the consumer device 320. Communication-enabled credit card 330 may alternatively receive power directly from the POS device. For example, communication-enabled credit card 330 may receive power when inserted into a POS chip-reading device.

If consumer device 320 and communication-enabled credit card 330 are communicating via link 310, consumer device 320 may generate and transmit a limited-use credit card number to communication-enabled credit card 330, which may then use the limited-use credit card number to make a purchase. This may all happen without direct involvement by a user of consumer device 320. In some embodiments, consumer device 320 may also transmit the details of the communication with communication-enabled credit card to a verification server, such as verification server 160 of FIG. 1 over a network.

Multiple consumer devices may be able to communicate with a single communication-enabled credit card 330. Communication-enabled credit card 330 may not be equipped with input/output devices sufficient for a user to accept or reject certain communications. Consumer device 320 and communication-enabled credit card 330 may as a result communicate over a secure wireless channel. To preserve security of communications between consumer device 320 and communication-enabled credit card 330, a method of frequency rotation may be employed. This method may use rolling codes (similar to operation of remote garage door openers) to protect data transmitted via link 310 from being intercepted. In general, consumer device 320 may send an initial code to communication-enabled credit card 330. For some embodiments, the initial code may be a final code from a previous communication. Communication-enabled credit card 330 may then issue a challenge to consumer device 320 requesting a new code based on previously agreed upon code-creation rules. Consumer device 320 may then respond with a new code and establish communication with communication-enabled credit card 330.

Figure 4:
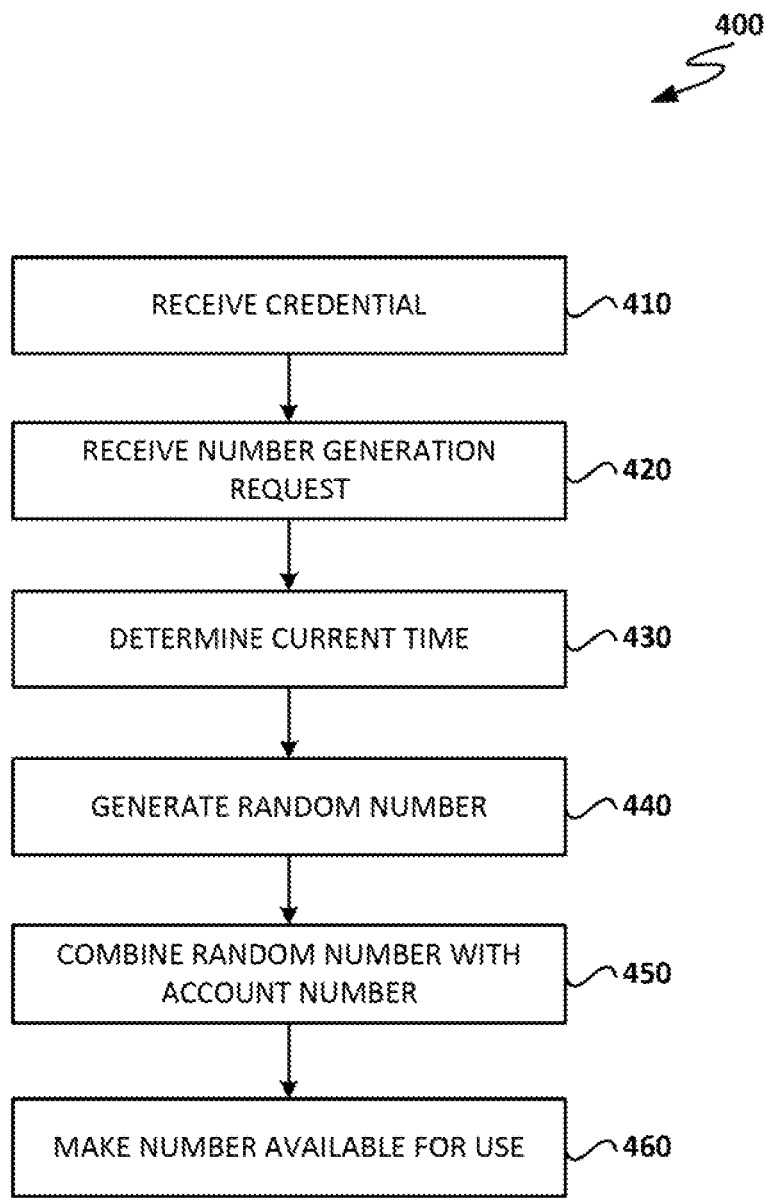
FIG. 4 illustrates example operations for generating a limited-use credit card number with a consumer device according to one embodiment.

FIG. 4 illustrates example operations 400 for generating a limited-use credit card number on a consumer device, such as consumer device 130 of FIG. 1. Operations 400 may begin at block 410, where the consumer device receives an account credential. The account credential may be associated with an account number already stored on the consumer device. Alternatively, the account number may be received simultaneously with the account credential. Both the account credential and the account number may be associated with a user of the consumer device.

At block 420, the consumer device may receive a request to generate a number. This request may originate from a user of the consumer device or from a device (e.g., purchase device 140) connected to or communicating with the consumer device. In some embodiments, the consumer device may also decide to generate a number at a certain time interval or otherwise decide to generate a number independently.

At block 430, the consumer device determines the current time. At block 440 the consumer device generates a number. The number may be generated based on the account credential received at block 410 and the current time determined at block 430. For example, the consumer device may supply the credential and the current time as seeds to a pseudo-random number generation service. The consumer device may alternatively use the account credential and the current time as inputs to a pseudo-random number generation algorithm executing on the consumer device. The precise pseudo-random number generation service, function, or algorithm is unimportant, so long as a verification server—which will validate the number—can make use of the same service, function, or algorithm.

At block 450, the consumer device combines the generated number with the account number to form a complete limited-use credit card number. For example, the account number may be the first 13 digits of the limited-use credit card number while the generated number may be used for the last 3 digits of the limited-use credit card number and the security code of the limited-use credit card number. Other total numbers of digits of a credit card number or other combinations of account portions and generated portions are contemplated by the present disclosure.

At block 460, the consumer device makes the limited-use credit card number created at block 450 available for use. Making the number available for use may involve displaying the number on a screen of the consumer device, transmitting the number to a separate device, directly submitting the number as part of a purchase order, or other methods of making the number available.

In some embodiments, the consumer device may also generate an alias for a user of the consumer device. The alias may be used in conjunction with a limited-use credit card number and may have a similarly limited use. That is, when a purchase order is sent to a merchant server, both the credit card number used and the name submitted as the card owner may be limited use. Similar to the creation of limited-use credit card numbers, a verification server may be able to verify an alias as being associated with a user and a card number based on known rules of generating the alias. When combined with the use of a limited-use credit card number, the alias may minimize the personal information that a user must disclose in order to make a purchase using a credit card number.

Figure 5:
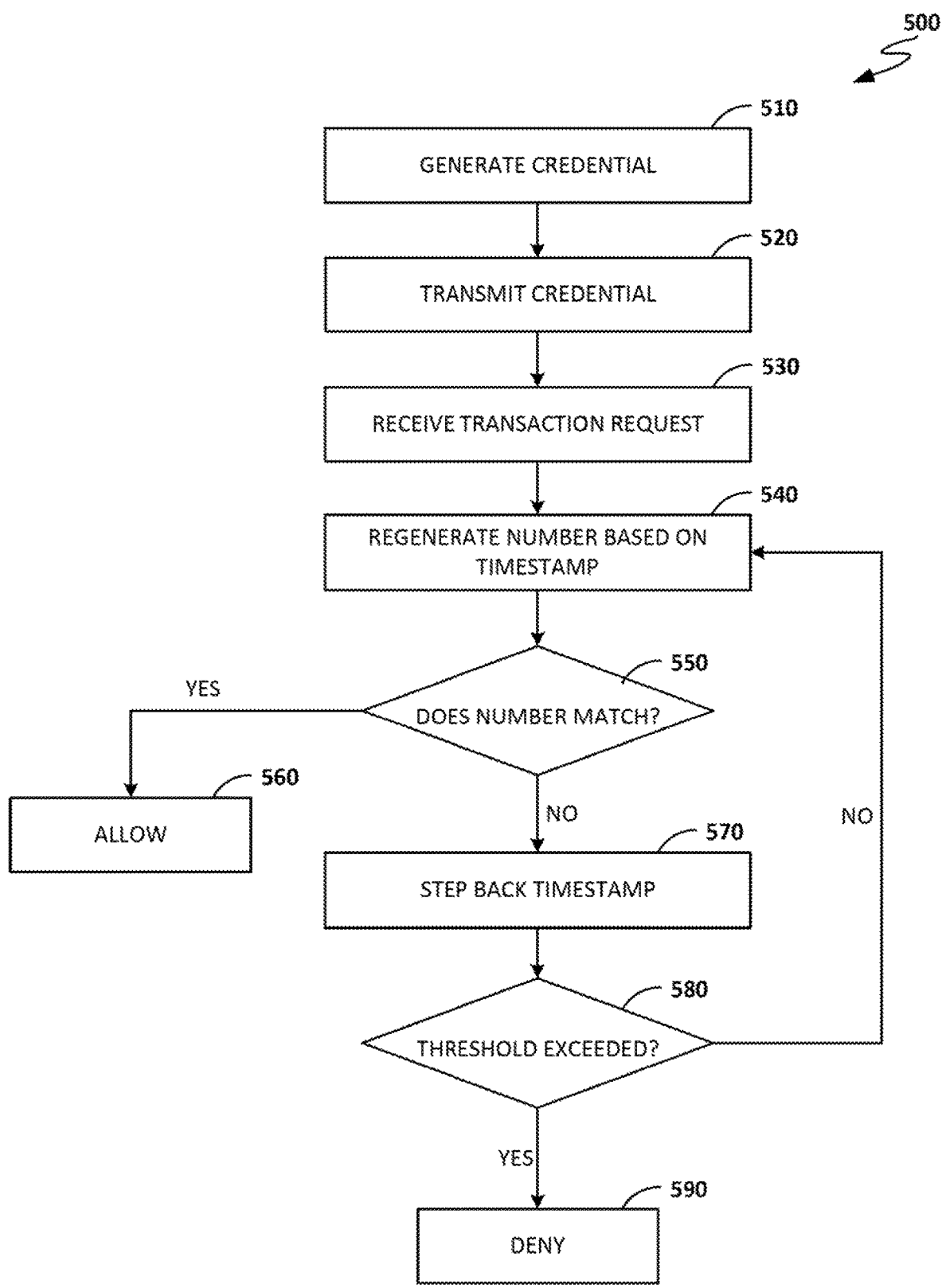
FIG. 5 illustrates example operations for validating a limited-use credit card number generated by a consumer device according to one embodiment.

FIG. 5 illustrates example operations 500 for validating a limited-use credit card number generated by a consumer device. Such validation may be performed by a verification server, such as verification server 160 of FIG. 1. Operations 500 may begin at block 510, where the verification server may generate an account credential. The account credential may be associated with a user and may be used in communications between the verification server and a consumer device, such as consumer device 130 of FIG. 1. For example, when the consumer device generates a series of digits using the account credential and the current time, the verification server may be able to derive a creation time of the series of digits using the account credential.

At block 520 the verification server may transmit the account credential to the consumer device. The consumer device may also obtain the account credential by a user of the consumer device entering the account credential, which may be obtained by the user from the verification server over email or other methods.

At block 530 the verification server may receive a transaction request, which may be from a merchant server, such as merchant server 150 of FIG. 1. The transaction request may include a limited-use credit card number, as well as a timestamp when the transaction request was submitted to the verification server by the merchant server. The limited-use credit card number may have been generated by the consumer device using the account credential transmitted at block 520.

At block 540 the verification server may regenerate the limited-use credit card number with the seeds used to generate the generated portion of the credit card number. The verification server separates the card number into an account number portion and a generated portion. Then, using a pseudo-random number generator, the verification server determines the time that was used as a seed for the pseudo-random number generator at the consumer device. For example, if the consumer device previously used the account credential and the then current time as seeds for a pseudo-random number generation algorithm, the verification server can use the account credential and the timestamp as seeds to that pseudo-random number generation algorithm to generate a verification number.

At block 550 the verification server may compare the verification number generated at block 540 with the generated portion to determine if the two numbers match. If the numbers do match, operations 500 proceed to block 560, where the transaction processes (e.g., by withdrawing funds from the user's account and providing these funds to the merchant or merchant's account). If the limited-use credit card number is valid for only one transaction, the limited-use credit card number should not be validated by the verification server in subsequent transaction requests. If the numbers do not match, operations 500 proceed to block 570.

At block 570, the verification server may step back the timestamp. A step back may be the smallest increment of the timestamp relevant to the pseudo-random number generator, which may be any increment of time. For example, the timestamp of the transaction request may be stepped back one millisecond (1 ms), a few milliseconds, tens of milliseconds, or hundreds of milliseconds. Such a change will alter the number generated by the pseudo-random number generator when the stepped-back timestamp is used as a seed.

At block 580, the verification server determines if a threshold of time has been exceeded by repeated steps back of the timestamp. If a timestamp has been stepped back too far (e.g., by exceeding the threshold), it may indicate that the time used as input in generating the limited-use credit card number is too far before when the transaction was submitted to be valid. The threshold itself may be any suitable time that allows for delays in user entry and/or network transmissions, but which is not so long as to render the limited-use credit card valid for longer than a single transaction. If the threshold time has not been exceeded, operations 500 return to block 540 to regenerate a number based on the stepped-back timestamp.

If the threshold has been exceeded, operations 500 proceed to block 590, where the transaction request is denied by the verification server. This may mean the limited-use credit card number was generated too far before the transaction was submitted. This may indicate that the purchase was submitted fraudulently or maliciously. Concurrently or shortly after the denial, verification server may also alert the merchant that sent the transaction request and/or a user associated with the account number that the transaction was attempted and that the number is no longer valid.

Figure 6:
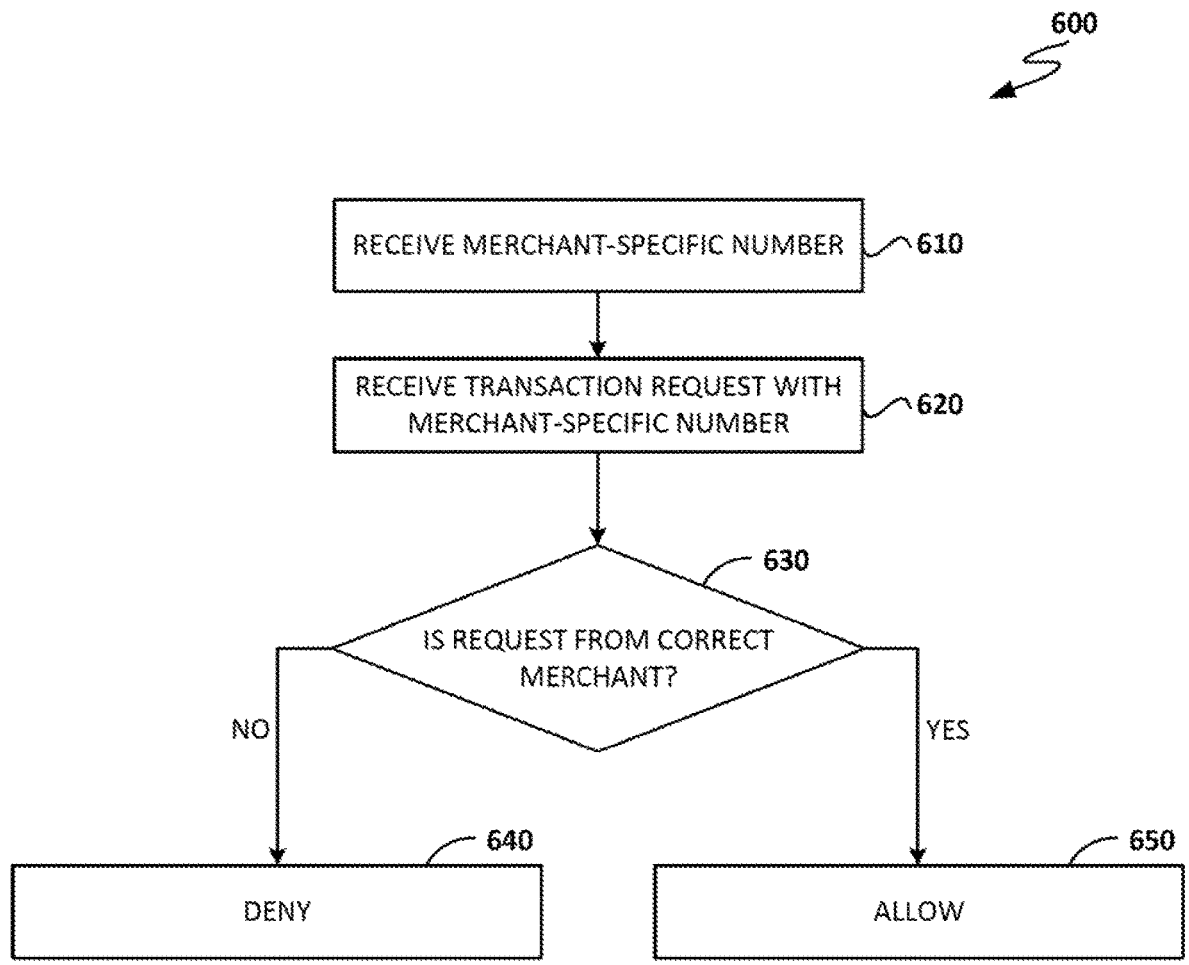
FIG. 6 illustrates example operations for validating a merchant-specific credit card number according to one embodiment.

FIG. 6 illustrates example operations 600 for validating a merchant-specific credit card number. Operations 600 may be performed by a verification server (e.g., verification server 160 of FIG. 1). In some embodiments, limited-use credit card numbers may be merchant limited rather than time or transaction limited. In such instances, operations 600 may be used.

Operations 600 may begin at block 610, where a verification server receives a merchant-specific credit card number, from a consumer device (e.g., consumer device 130 of FIG. 1). Such a number may be generated by the consumer device in much the same way as a limited-use credit card number may be generated by the operations 400 illustrated in FIG. 4. When the merchant-specific number is generated, the consumer device may transmit the merchant-specific number to the verification server along with an identifier of a merchant associated with the single merchant number. The verification server may then store the merchant-specific credit card number and the identity of the associated merchant in order to subsequently validate transactions using the merchant-specific credit card number.

At block 620, the verification server may receive a transaction request containing the merchant-specific number received at block 610. Such a request may be received from a merchant server, such as merchant server 150 of FIG. 1. At block 630, the verification server may determine if the merchant server that transmitted the request is operated by the same merchant as identified with the merchant-specific number received at block 610.

If the merchant that transmitted the request is not the same as the merchant identified by the merchant-specific number, operations 600 may proceed from block 630 to block 640 where the transaction request is denied. Concurrently or shortly after the denial, verification server may also alert the merchant associated with the merchant-specific number and/or a user associated with the account number that the transaction was attempted and denied.

If the merchant that transmitted the request is the same as the merchant identified by the merchant-specific number, operations 600 may proceed from block 640 to block 650 where the transaction request is allowed, and the transaction processes.

Figure 7:
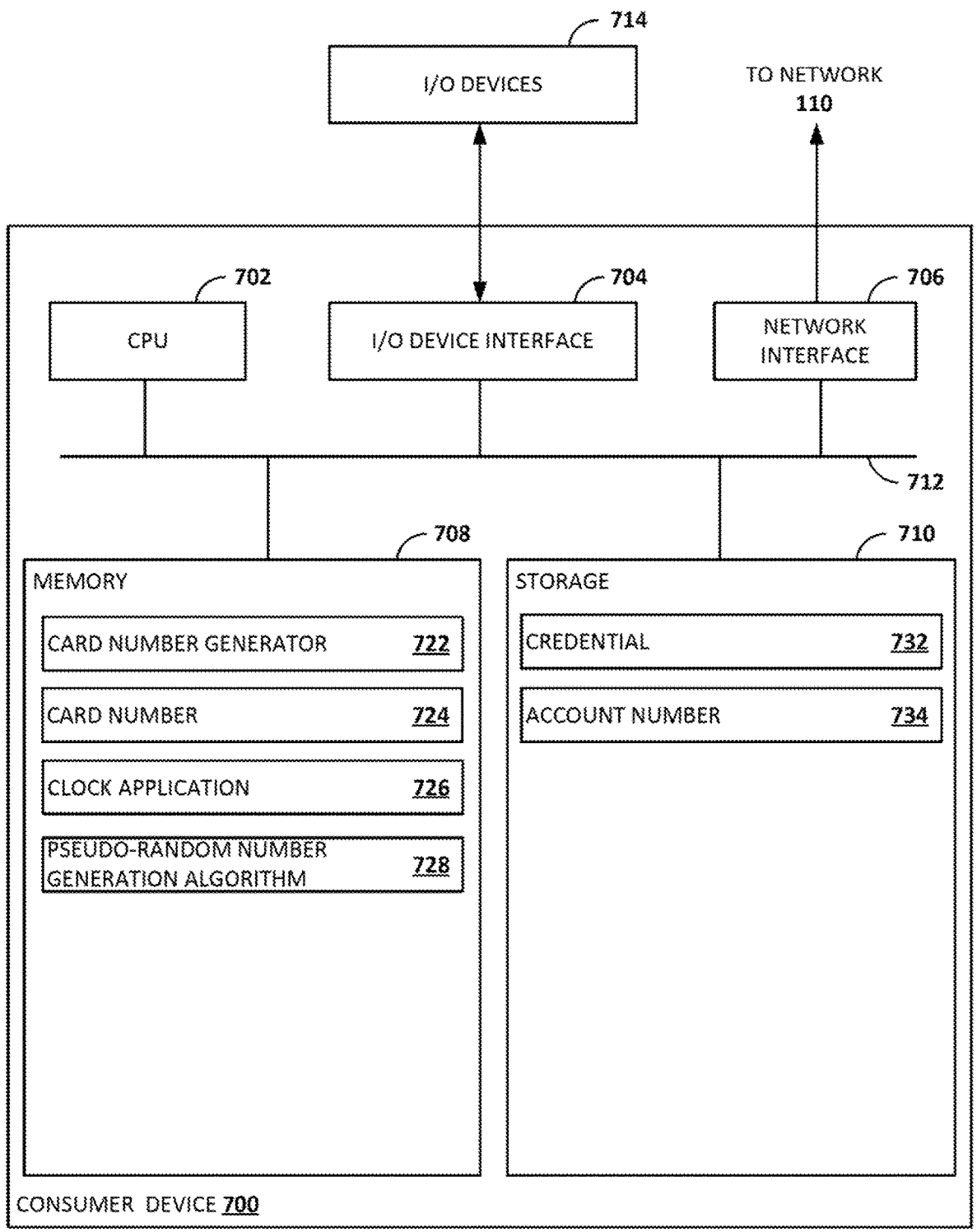
FIG. 7 illustrates an example consumer device for generating a limited-use credit card number according to one embodiment.

FIG. 7 illustrates an example consumer device for generating a limited-use credit card number. As shown, the consumer device 700 includes, without limitation, a central processing unit (CPU) 702, one or more input/output (I/O) device interfaces 704, which may allow for the connection of various I/O devices 714 (e.g., keyboards, displays, mouse devices, pen input, etc.) to the consumer device 700, network interface 706, memory 708, storage 710, and an interconnect 712.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, memory 708, and storage 710. CPU 702 is included to be representative of a single CPU, multiple CPUs, a single CPU having multiple processing cores, and the like. I/O device interface 704 may provide an interface for capturing data from one or more input devices integrated into or connected to consumer device 700, such as keyboards, mice, touchscreens, and so on. The memory 708 may represent a random access memory (RAM), while the storage 710 may be a solid state drive, for example. Although shown as a single unit, the storage 710 may be a combination of fixed and/or removable storage devices, such as fixed drives, removable memory cards, network attached storage (NAS), or cloud-based storage.

As shown, memory 708 includes card number generator 722, card number 724, clock application 726, and pseudo-random number generation algorithm 728. Card number generator 722 generally accesses credential 732 stored in storage 710 and receives a time from clock application 726. Card number generator 722 uses credential 732 and the time as seeds for pseudo-random number generation algorithm 728. Pseudo-random number generation algorithm produces a series of digits. Card number generator 722 may combine (e.g., append) this series of digits with account number 734 stored in storage 710 to create card number 724. Card number 724 may then be transmitted over network 110 via network interface 706, displayed to a user of consumer device 700 on I/O devices 714 via I/O device interface 704, or otherwise made available for use.

Card number generator 722, clock application 726, and pseudo-random number generation algorithm 728 may all be executed based on instructions stored in storage 710. Such instructions may be executed by CPU 702. Card number 724 might not contain executable instructions, but may consist of temporary data not stored in storage 710.

As shown, storage 710 includes credential 732 and account number 734. As discussed above, credential 732 and account number 734 may be used in the creation of card number 724.

One embodiment of the present disclosure provides a method for generating limited-use credit card numbers by a consumer device. The method generally includes determining a current time; generating a first series of digits based on the current time and an account credential associated with an account number; combining, by the consumer device, the first series of digits with the account number to form a first card number; and making the first card number available for use.

According to some embodiments, making the first card number available for use includes transmitting the first card number from the consumer device to a user purchase device.

According to some embodiments, making the first card number available for use involves displaying the first card number on a screen of the consumer device.

According to some embodiments, making the first card number available for use entails transmitting the first card number from the consumer device over a link to a communication-enabled credit card.

According to some embodiments, the method further involves generating a second series of digits based on the current time and the account credential, combining the second series of digits with the account number to form a second card number, assigning the second card number to a particular merchant, and making the second card number available for use.

According to some embodiments, generating the first series of digits based on the current time and the account credential includes using the current time and the account credential as seeds for a pseudo-random number generator.

According to some embodiments, the account credential comprises a second series of digits distinct from the account number.

According to some embodiments, the combining includes appending the first series of digits to the account number to form the first card number.

According to some embodiments, the combining entails appending at least a portion of the first series of digits to the account number to form the first card number. In this case, a remaining portion of the first series of digits may be designated as a card verification value (CVV) for the first card number.

According to some embodiments, the method further involves transmitting, over a network to a merchant, the first card number.

According to some embodiments, the first card number is valid for only one transaction.

According to some embodiments, the method further entails receiving the account credential from a verification server over a network.

According to some embodiments, the consumer device includes an interface for entry of the account credential by a user of the consumer device.

Another embodiment of the present disclosure provides a method for validating a limited-use credit card number. The method generally includes receiving over a network a request for a first transaction comprising a card number and a timestamp for the first transaction, wherein the card number comprises an account portion and a generated portion; determining an account number from the account portion; obtaining a creation time from the generated portion; determining whether the creation time is within a threshold time of the timestamp; and processing the first transaction according to the account number if the creation time is within the threshold time of the timestamp.

According to some embodiments, the card number is only valid for one transaction.

According to some embodiments, the method further includes receiving, from a user verification device over the network, a merchant-specific card number valid for a particular merchant; receiving, from a merchant over the network, a request for a second transaction comprising the merchant-specific card number; determining whether the merchant is the particular merchant based on the merchant-specific card number; and processing the second transaction if the merchant is the particular merchant. For some embodiments, the method further involves preventing the second transaction from processing if the merchant is determined not to be the particular merchant; and transmitting over the network an alert message to a device corresponding to a user associated with the account number of the request for the second transaction.

According to some embodiments, the method further entails preventing the transaction from processing if the creation time is outside the threshold time of the timestamp; and transmitting over the network an alert message to at least one of a device associated with a merchant from whom the request for the first transaction was received or a device corresponding to a user associated with the account number.

According to some embodiments, obtaining the creation time from the generated portion includes supplying an account credential associated with the account number and the timestamp to an pseudo-random number generator to generate a verification number; determining if the verification number matches the generated portion; and if the verification number does not match the generated portion: decrementing the timestamp to create a stepped-back timestamp and supplying the account credential and the stepped-back timestamp to the pseudo-random number generator to regenerate the verification number.

For some embodiments, the account credential comprises a series of digits distinct from the account number.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments, and advantages are merely illustrative and are not considered elements or limitations of the appended claims except where explicitly recited in a claim. Likewise, reference to "the invention" shall not be construed as a generalization of any inventive subject matter disclosed herein and shall not be considered to be an element or limitation of the appended claims except where explicitly recited in a claim.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer-readable medium(s) having computer-readable program code embodied thereon.

Any combination of one or more computer-readable mediums may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples of a computer-readable storage medium include: an electrical connection having one or more wires, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the current context, a computer-readable storage medium may be any tangible medium that can contain or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for generating limited-use credit card numbers by a consumer device, the method comprising:
   determining, by the consumer device, a current time;
   generating, by the consumer device and independently of a verification server, a first series of digits based on the current time and an account credential associated with an account number;
   combining, by the consumer device and independently of the verification server, the first series of digits with the account number to form a first card number; and
   making the first card number available for use.

2. The method of claim 1, wherein making the first card number available for use comprises transmitting the first card number from the consumer device to a user purchase device.

3. The method of claim 1, wherein making the first card number available for use comprises displaying the first card number on a screen of the consumer device.

4. The method of claim 1, wherein making the first card number available for use comprises transmitting the first card number from the consumer device over a link to a communication-enabled credit card.

5. The method of claim 1, further comprising:
   generating a second series of digits based on the current time and the account credential;
   combining the second series of digits with the account number to form a second card number;
   assigning the second card number to a particular merchant; and
   making the second card number available for use.

6. The method of claim 1, wherein generating the first series of digits based on the current time and the account credential comprises using the current time and the account credential as seeds for a pseudo-random number generator.

7. The method of claim 1, wherein the account credential comprises a second series of digits distinct from the account number.

8. The method of claim 1, wherein the combining comprises appending the first series of digits to the account number to form the first card number.

9. The method of claim 1, further comprising transmitting, over a network to a merchant, the first card number.

10. The method of claim 1, wherein the first card number is valid for only one transaction.

11. The method of claim 1, further comprising receiving the account credential from the verification server over a network.

12. The method of claim 1, wherein the consumer device comprises an interface for entry of the account credential by a user of the consumer device.

13. A consumer device comprising:
   a processor; and
   a memory having instructions stored thereon which, when executed by the processor, perform an operation for generating limited-use credit card numbers, the operation comprising:
      determining, by the consumer device, a current time;
      generating, by the consumer device and independently of a verification server, a series of digits based on the current time and an account credential associated with an account number;
      combining, by the consumer device and independently of the verification server, the series of digits with the account number to form a card number; and
      making the card number available for use.

14. The consumer device of claim 13, wherein generating the series of digits based on the current time and the account credential comprises using the current time and the account credential as seeds for a pseudo-random number generator.

15. The consumer device of claim 13, wherein the combining comprises appending at least a portion of the series of digits to the account number to form the card number and wherein a remaining portion of the series of digits is designated as a card verification value (CVV) for the card number.

16. The consumer device of claim 13, wherein making the card number available for use comprises transmitting the card number from the consumer device to a user purchase device.

17. The consumer device of claim 13, further comprising:
   a screen, wherein making the card number available for use comprises displaying the card number on the screen; and
   an interface for entry of the account credential by a user of the consumer device.

18. A non-transitory computer-readable medium having instructions stored thereon which, when executed by a processor of a consumer device, perform an operation for generating limited-use credit card numbers by the consumer device, the operation comprising:
   determining, by the consumer device, a current time;
   generating, by the consumer device and independently of a verification server, a series of digits based on the current time and an account credential associated with an account number;
   combining, by the consumer device and independently of the verification server, the series of digits with the account number to form a card number; and
   making the card number available for use.

19. The computer-readable medium of claim 18, wherein generating the series of digits based on the current time and the account credential comprises using the current time and the account credential as seeds for a pseudo-random number generator.

20. The computer-readable medium of claim 18, wherein the combining comprises appending at least a portion of the series of digits to the account number to form the card number and wherein a remaining portion of the series of digits is designated as a card verification value (CVV) for the card number.

* * * * *